United States Patent [19]

Brembeck et al.

[11] Patent Number: 4,834,026
[45] Date of Patent: May 30, 1989

[54] POULTRY FEEDER ASSEMBLY

[75] Inventors: Howard S. Brembeck, Goshen; Ray E. Swartzendruber, Syracuse, both of Ind.

[73] Assignee: CTB, Inc., Milford, Ind.

[21] Appl. No.: 150,992

[22] Filed: Feb. 1, 1988

[51] Int. Cl.$^4$ ................................................ A01K 5/00
[52] U.S. Cl. ...................................................... 119/53
[58] Field of Search ...................... 119/53, 51 R, 52 B, 119/52 R

[56] References Cited

U.S. PATENT DOCUMENTS 4,070,990  1/1978  Swartzendruber ................... 119/53

Primary Examiner—Robert Peshock
Attorney, Agent, or Firm—Richard Bushnell

[57] ABSTRACT

A poultry feeder assembly for use with an automated conveyor-type feed system. The feeder assembly is inexpensive to manufacture and comprises only two assembly pieces which are formed of a resilient, flexible material allowing for easy assembly and adjustment without tool or implement. Multi-stage incremental positioning provided between a dome/feeder-tube combination and a pan member allows feeding of brood through pre-harvest sized foul and renders the feeder assembly adaptable for use with feeds having varying flow characteristics.

12 Claims, 3 Drawing Sheets

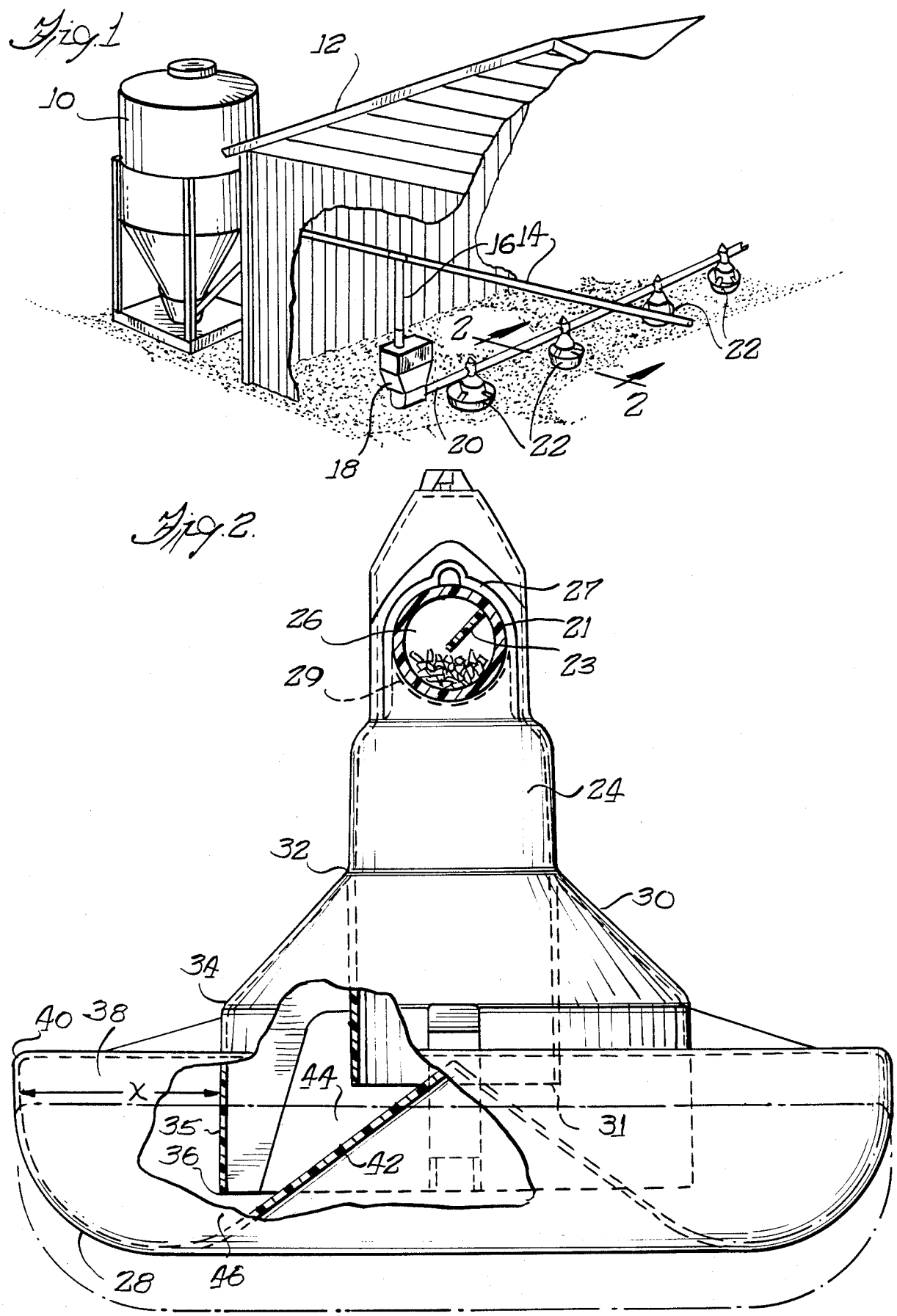

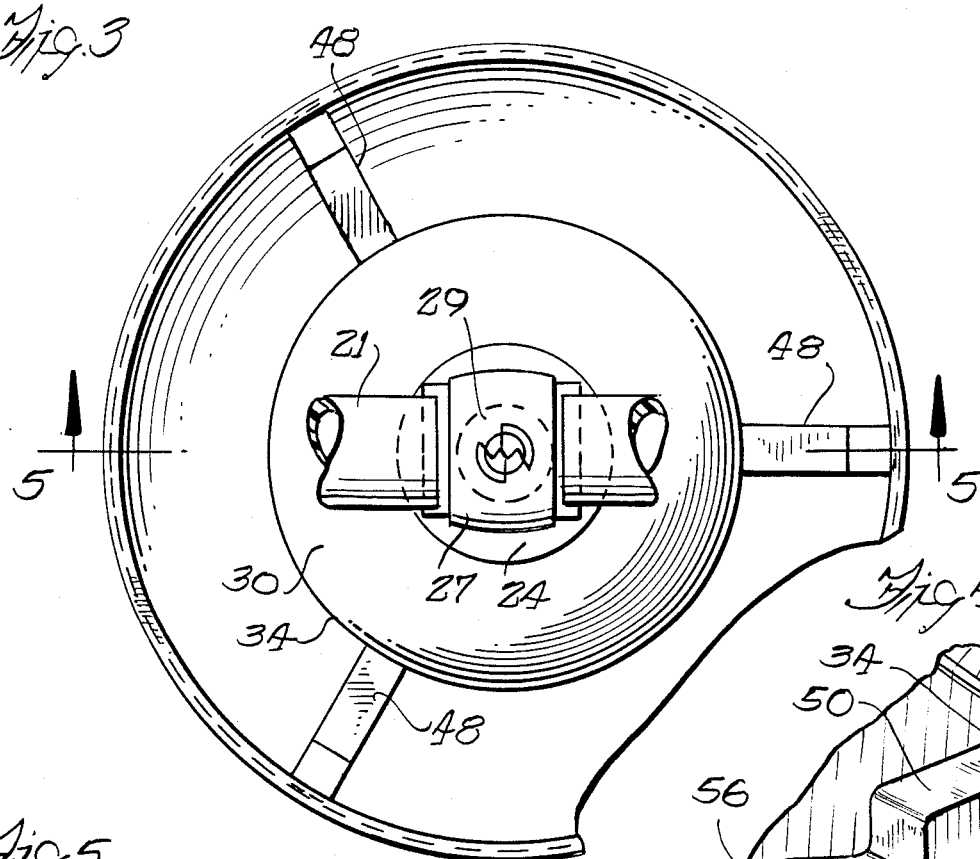
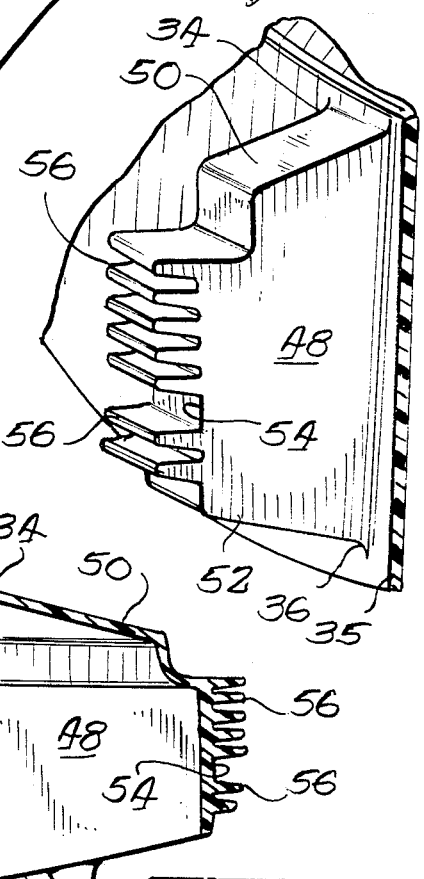
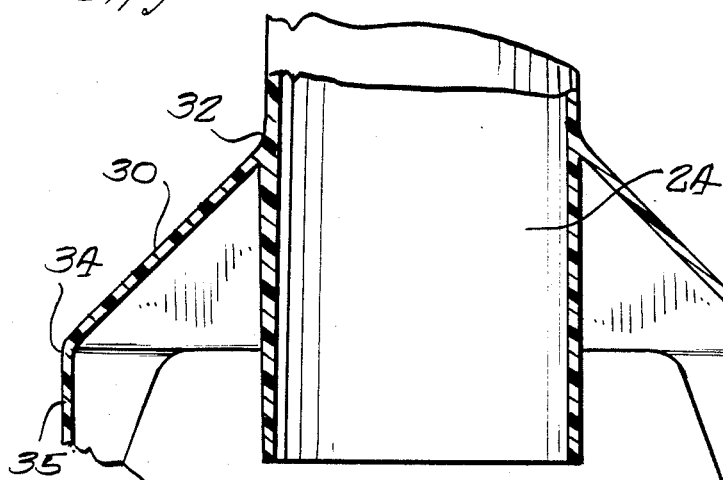
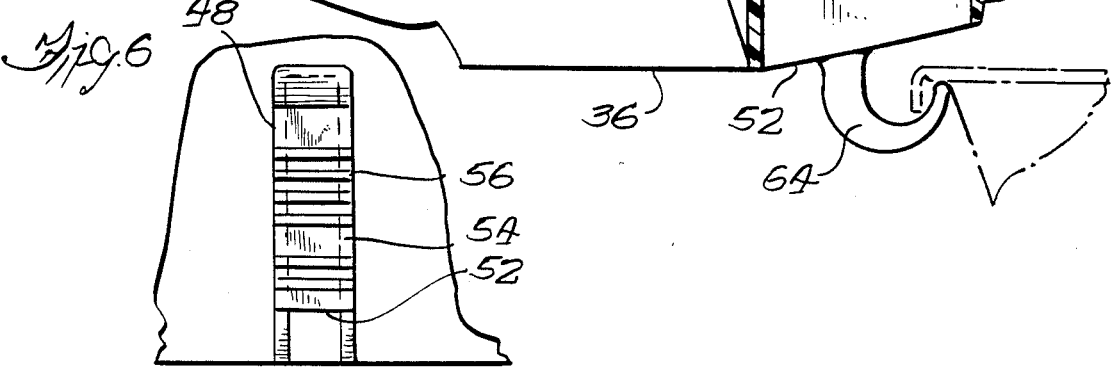

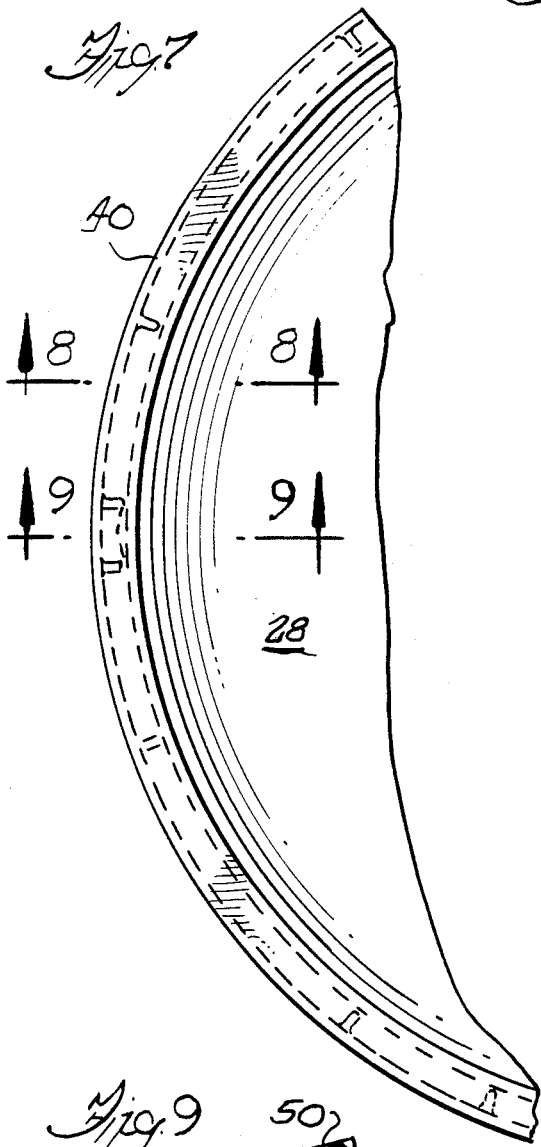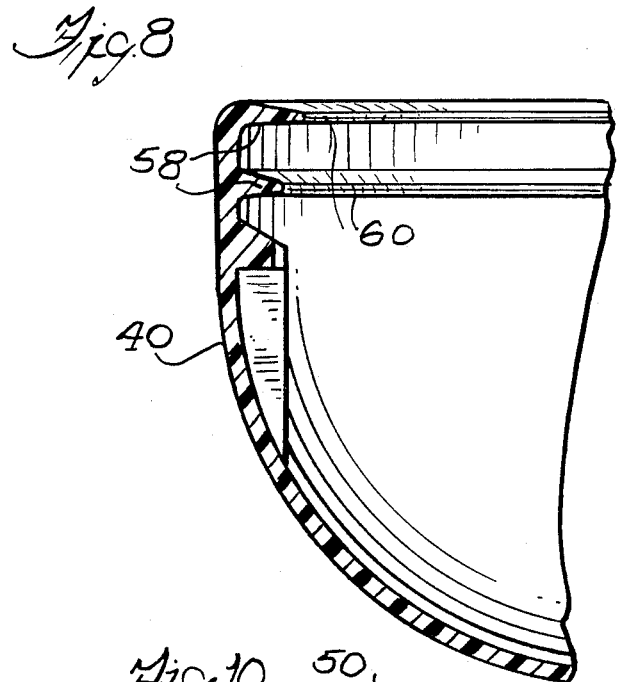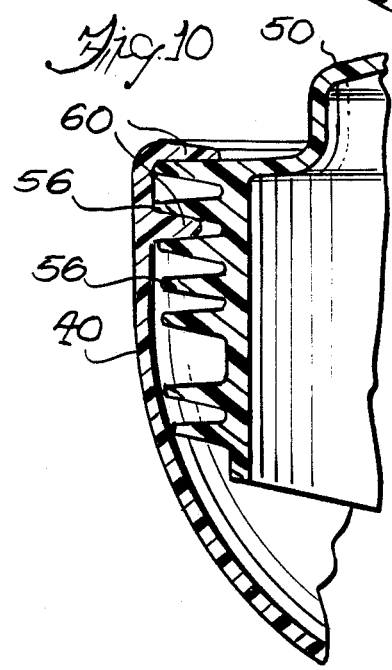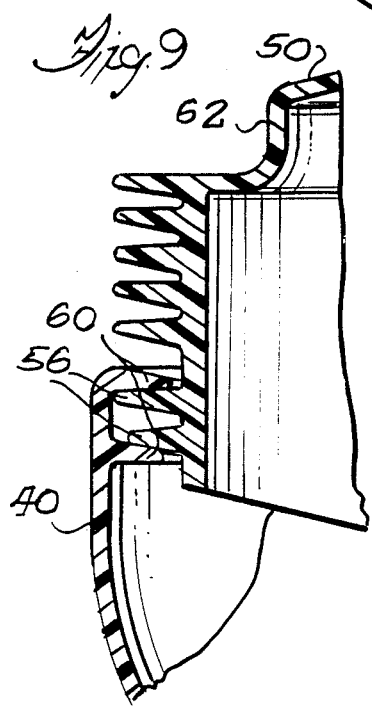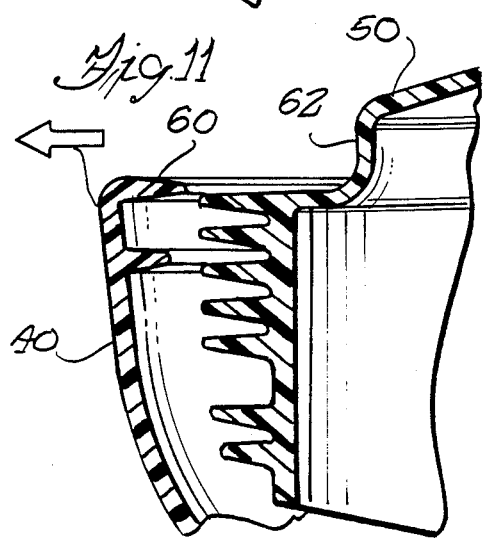

POULTRY FEEDER ASSEMBLY

BACKGROUND OF THE INVENTION

This invention relates to animal feeding systems, and more particularly concerns feeder pan assembly apparatus for poultry and the like.

Feeder pan assemblies are among the most important parts of modern automated feeding systems which allow poultry and the like to be raised from inception to harvest with a minimum amount of time and effort. Utilization of such efficient low-cost feeding systems is today a prerequisite to economic survival in the animal husbandry business.

Operation of this type of feeding system usually commences with a supply of feed being conveyed from a storage hopper, through a series of transport conduits and ultimately into individual feeder pan assemblies which are readily accessible to the feeding poultry crop. At present, feeder assemblies of the type and kind referred to here generally comprise a dome portion, including a feeder tube for receiving the feed from the transport conveyors, and pan means into which the feed is directed after leaving the feeder tube and which provides the poultry with access to the feed. Additionally, some type of device for interconnecting the pan with the dome and feeder tube combination is also required. That is, some kind of clip or wire form is needed to hold the assembly together. Therefore, today's feeders comprise at least three separate assembly pieces.

Three-piece feeder assemblies have proved highly successful and have been widely accepted and used throughout the industry. Examples of these devices are seen in U.S. Pat. Nos. 3,911,868 and 4,070,990.

BRIEF SUMMARY OF THE INVENTION

It is a primary object of the present invention to provide a more efficient poultry feeder assembly capable of being produced with low manufacturing costs and comprising only two required assembly parts, both of which can be formed of plastic or a similar lightweight, inexpensive material.

Another object is to provide a poultry feeder assembly which can be easily assembled and disassembled by a feed system operator at its point of use without utilization of any type of tool.

A further objective is to provide a poultry feeder assembly which can be quickly and easily adjusted by a feed system operator to effectively and efficiently feed poultry ranging from brood-size to pre-harvest size. A related object is to provide a feeder which can be adjusted in very fine increments such that it can be used with feeds having a wide variety of flow characteristics.

A still further objective is to provide a poultry feeder assembly which substantially minimizes feed loss caused by the feeding foul raking the surface of the feed while simultaneously providing continuous access to a limited amount of fresh feed for a large number of consuming poultry.

Yet another objective is to provide a poultry feeder assembly which includes a hook arrangement to facilitate periodic cleaning procedures of the automated feeding system.

Summarily stated, the novel poultry feeder assembly comprises a dome-shaped body contoured to prevent foul from roosting upon it and a feeder tube formed integral with the dome and extending through an uppermost surface thereof to operatively connect with a feed transport conveyor system. Feed supplied by the transport conveyor falls into the feeder tube and is directed into a pan which is disposed below the lowermost edges of both the dome body and feeder tube. The outer periphery of the pan, in combination with the outer wall of the dome, form a limited annular poultry feeding area accessible to a large number of feeding foul.

Releasable and adjustable interconnection between the pan and the remaining structure is provided by wing members formed integral with and extending outwardly of the dome-shaped feeder body at predetermined angles. The distal ends of these wing members are provided with multiple, spaced fingers which can be positioned to interlock with a corresponding arrangement of flange members provided on an annular lip portion of the pan. Utilization of materials with sufficient resilient flexibility to form the pan member of the poultry feeder assembly allows the feed system operator to manually release and adjust the device without the aid of any tool. Thus the feeder can be easily adjusted at its point of use to accommodate a variety of different sized birds and to adapt to a varying range of feed flow characteristics.

A cleaning hook arrangement is also formed integral with the poultry feeder assembly to facilitate periodic cleaning procedures.

BRIEF DESCRIPTION OF THE DRAWINGS

FIG. 1 is a perspective view of an automated poultry feeding system including the novel poultry feeder assemblies herein disclosed;

FIG. 2 is an elevational side view of the poultry feeder assembly including a fragmentary sectional view taken along line 2—2 of FIG. 1;

FIG. 3 is a top plan view of the poultry feeder assembly;

FIG. 4 is a fragmentary enlarged perspective view showing one of the wing members which extend outwardly from the dome portion;

FIG. 5 is an enlarged fragmentary sectional view taken along line 5—5 as shown in FIG. 3;

FIG. 6 is a fragmentary elevational view showing the outside edge of the wing member end of FIG. 4;

FIG. 7 is a fragmentary top plan view showing a portion of the upper edge of the pan;

FIG. 8 is an elevational fragmentary sectional view taken along line 8—8 of FIG. 7;

FIG. 9 is an elevational fragmentary sectional view taken along line 9—9 of FIG. 7 showing the interconnection between a wing member and the pan with the poultry feeder assembly in a "brood mode" position;

FIG. 10 is an elevational fragmentary sectional view similar to FIG. 9 showing the poultry feeder assembly interconnected in a "finishing mode" position; and FIG. 11 is an elevational fragmentary sectional view similar to FIGS. 9 and 10 showing the resilient, flexible nature of the poultry feeder assembly needed during interconnection and adjustment procedures.

DETAILED DESCRIPTION OF THE INVENTION

While the invention will be described in connection with a preferred embodiment, it will be understood that it is not intended to limit the invention to that embodiment. On the contrary, it is intended to cover all alternatives, modifications and equivalents as may be included within the spirit and scope of the invention.

Turning first to FIG. 1, there is shown a modern, automated feeding system used in connection with raising poultry and like domesticated farm animals. Within the feeding system are shown a number of novel poultry feeder assemblies 22 as they would normally be used in such a system. The feeding process begins by placing feed in a bulk storage hopper 10 which is usually located outside a conventional poultry house structure 12. When needed, feed exits the funnel-shaped bulk storage hopper 10 through an open orifice located at the bottom of the hopper and enters a system of transport conveyors which ultimately deliver the feed to the individual poultry feeder assemblies 22.

The transport conveyor system comprises a bulk conveyor 14, drop tubes 16, subsidiary hoppers 18 and individual transport conveyors 20 which communicate directly with the poultry feeder assemblies 22. The individual transport conveyors 20 include tubes 21 equipped with internal augers 23 utilized to move the feed granules within the conveyors.

Turning now to the details of the novel poultry feeder assembly 22, FIG. 2 shows a cylindrical hollow feeder drop tube 24 having a feed access orifice 26 which extends completely transversely through an upper end attachment portion 27 of the feeder drop tube 24 and serves as a passage into and out of which the individual transport conveyor 20 passes to operatively connect the poultry feeder assembly 22 with the remainder of the automated feeding system. Corresponding orifices 29 formed in the bottom half of the individual transport conveyor tube 21 at each point of intersection with the feeder drop tubes 24 causes feed traveling in the individual transport conveyors 20 to fall under its own weight into the feeder drop tubes 24.

Modern poultry feeding practice calls for storage of a limited quantity of feed within each poultry feeding assembly 22 to ensure that the poultry will have an adequate supply of feed at all appropriate times. To this end, the cylindrical feeder drop tube 24 extends vertically downward from feed access orifice 26 approximately 6 inches before terminating at a lower edge 31 which is spaced a predetermined distance above a separate circular pan member 28 as best seen in FIG. 2. In this arrangement, the feeder drop tube 24 serves the dual function of directing feed towards the pan member 28 and acting as a limited storage area for feed once the pan has been filled as is discussed in greater detail below.

Again as best seen in FIG. 2, the poultry feeder assembly 22 also includes a hollow cylindrical dome portion 30 which integrally meets the feeder drop tube 24 at an intermediate point 32 located below feed access orifice 26. Thereafter, the dome structure 30 slopes outwardly and downwardly until reaching a second point 34 and then turning vertically downward in a cylindrical wall 35 terminating at a bottom edge 36. The sloped portion of the dome 30 between points 32 and 34 serves to prevent foul from roosting on the poultry feeder assembly 22 when feeding. The vertical cylindrical wall 35 portion of the dome 30 between points 34 and 36 defines the inner wall of an annular feeding area 38 having a radial width X which is limited by an outer wall 40 of the pan member 28. The distance X is preferrably selected so as to provide sufficient area to feed while at the same time discouraging even small poultry from climbing bodily into the feeding area 38 and blocking other poultry and/or contaminating the feed.

Pan member 28 further includes a conical bottom portion 42 having a vertex lying substantially directly below the center of feeder drop tube 24. So arranged, feed granules exiting the feeder drop tube 24 strike the conical pan bottom 42 and flow outwardly and downwardly past a first gate 44 formed between the feeder tube's lower edge 31 and the conical pan bottom 42. Continuing downwardly and outwardly, the granules next travel past a second gate 46 formed between the dome's lower edge 36 and the conical pan bottom 42 and ultimately come to rest within the annular feeding area 38. Once the feed granules fill the pan to a height associated with the relationship between the pan member 28 and the remainder of the apparatus, as discussed in detail below, additional feed backs up in the feeder drop tube 24 until rising to the individual transport conveyor tube orifice 29 at which point feed moving along the individual transport conveyor 20 bypasses the poultry feeder assembly 22 until such time as additional feed is again required.

Thus the poultry feeder assembly 22 provides means to automatically and continuously deliver feed to a large number of feeding foul while minimizing the chance of roosting in the feed or on the feeder assembly. The novel poultry feeder assembly 22 here disclosed can be manufactured very inexpensively due largely in part to the fact that it consists of only two assembly pieces. Moreover, the device can be easily adjusted to accommodate different sizes of poultry ranging from brood-size to pre-harvest-size. The unique adjustablility of the poultry feeder assembly discussed in greater detail below also enables the device to dispense feeds having free-flowing viscosity characteristics as well as those feeds having high-fat contents and viscous flow characteristics.

These later stated objectives are achieved largely in part by the means used to interconnect the pan member 28 to the remainder of the poultry feeder assembly 22. Interconnection is accomplished by providing three wing members 48 formed integral with the dome 30 as best seen in FIG. 3. The wing members 48 are spaced about the circumference of the dome 30 and, as shown in FIG. 5, comprise a top edge 50 which extends downwardly and outwardly from the point 34 at which the dome 30 ends its downward slope. As best seen in FIGS. 4, 5 and 6, a bottom edge 52 of each wing member 48 slopes gradually upward from the bottom edge 36 of dome 30. An outside edge 54 of wing member 48 comprises a series of closely spaced fingers 56. These fingers 56 are adapted to interconnect with corresponding flanges 58 disposed along the inside and uppermost edge of angular sidewall 40 of the pan 28 as best shown in FIGS. 7 through 11. Flanges 58 form a double-rim 60 along the pans upper edge into which any corresponding pair of adjacent wing member fingers 56 can be engaged to lock the poultry feeder assembly 22 together.

Utilizing the various interlock positions to raise and lower the pan member 28 relative to the remaining structure opens or closes the feed gates 44 and 46 and thereby regulates the flow of feed from the feeder drop tube 24 into the annular feeding area 38. This enables brood-size birds to feed just as easily as pre-harvest sized birds. For example, FIG. 9 shows the lowermost pair of wing member fingers 56 engaging the double-rim 60. In this position, gates 44 and 46 are substantially wide open allowing for a high flow of feed and therefore a high feed level in the annular feeding area 38. The three possible interlock positions between these lower two wing fingers 56 and the double-rim 60 is referred to as the "brood mode" as it allows brood-sized foul to utilize the feeder.

FIG. 10 shows the uppermost pair of wing member fingers 56 engaging double-rim 60. In this position, gates 44 and 46 are closed almost as far as possible thus allowing only a minimal amount of feed flow past the gates. This results in a low feed level in the annular feeding area 38. The five available positions using the upper group of wing member fingers 56 are referred to as the "finishing mode" positions, and are used with pre-harvest birds.

The closely spaced incremental positions available in both the "brood" and "finishing" modes are needed to contend with various feed flow characteristics inherent in the several different feeds required at the various stages of poultry growth. Such fine incrementation can only be achieved because of the double-rim 60 configuration which allows the narrow incremental movement discussed and maintains sufficient strength in the pan to provide adequate support. Additionally, the double-rim 60 arrangement helps minimize feed loss caused by the poultry raking over the feed surface by creating a complex rim structure over which feed granules are not likely to pass.

Adjustability between the various positions as well as attachment and detachment of the pan 28 from the wing members 48 is easily accomplished due to the resilient flexibility of the materials used in construction of the poultry feeder assembly 22 as seen in FIG. 11. The feed system operator need only push on a thumb rest 62 formed in the top edge 50 of the wing member 48 and pull and flex an adjacent marginal portion of the pan 28 outwardly to disengage the fingers 56 from flanges 58. This simple procedure can be performed wherever the feeder pan assembly 22 is located and requires only a minimal amount of strength.

Finally, the preferred embodiment of the invention includes a hook member 64 formed with and protruding downward from the bottom edge 52 of one of the wing members 48 as depicted in FIG. 5. The hook member 64 is used to suspend the pan 28 from the wing member 48, as shown in broken lines in FIG. 5, to facilitate periodic cleaning procedures.

The invention is claimed as follows:

1. A feeder assembly for poultry and the like comprising feeder tube means operatively connectable with a feed conveyor for receiving and directing feed, dome means integrally formed with said feeder tube means including a wing means extending therefrom and having a plurality of outwardly projecting fingers formed at a distal end, and releasable pan means having an upstanding side wall and annular lip means for adjustably engaging with said projecting fingers of said wing means thereby forming a two-piece feeder assembly having an annular poultry feeding area between said dome means and said pan means for efficiently and effectively accommodating various feed characteristics and feeding brood through harvest sized poultry and the like.

2. The poultry feeder assembly of claim 1, wherein said feeder tube means terminates at an edge above said pan means to form a first gate through which feed can pass.

3. The poultry feeder assembly of claim 2, wherein said dome means terminates at an edge above said pan means radially outward of said feeder tube means to form a second gate through which feed can pass.

4. The poultry feeder assembly of claim 3, wherein said annular lip means comprise a double-flange arrangement for interlocking with said outwardly projecting fingers of said wing means and for maintaining sufficient pan means strength to provide for fine incremental adjustability and for minimizing feed loss caused by feeding poultry raking over an exposed feeding surface.

5. The poultry feeder of claim 1, being constructed of materials having sufficient resilient flexibility for allowing manual flexing thereof for engaging, adjusting, and disengaging said dome means from said pan means.

6. The poultry feeder assembly of claim 1, wherein said wing means includes an integral hook portion for hanging said pan means from the wing means during periodic cleaning procedures.

7. A flexible, resilient feeder assembly for poultry and the like comprising dome means, associated releasably engageable pan means, said dome means having feeder tube means for operatively connecting with a feed conveyor and for directing feed into said pan means, and coupling means comprising wing members including outermost ends having projecting fingers formed thereon integrally formed with said dome means for releasably and adjustably interconnecting said dome means with said pan means, said pan means having an inturned flange forming an annular lip structure to engage said dome coupling means.

8. The flexible, resilient feeder assembly of claim 8, wherein at least one of said dome means and the pan means is constructed of material having flexibility and resiliency characteristics sufficient to allow manual flexing thereof for attachment, detachment and adjustability of the dome means and pan means relative to one another without requiring tools.

9. The flexible, resilient feeder assembly of claim 8, wherein the coupling means includes a hook member formed integral with said wing means for suspending said pan means from said dome means during cleaning procedures.

10. A feeder assembly comprising a feed drop tube member connectable with a feed conveyor, a pan member and coupling means adjustably connecting said drop tube member and said pan member together, said coupling means comprising annularly disposed radially projecting flange means integral with one of said members and a plurality of vertically spaced radially projecting finger means integral with the other of said members and releasably interengageable with said flange means, one of said members being formed of a flexible resilient material for enabling said one member to be manually deformed sufficiently to permit disengagement and reengagement of said flange means and said finger means.

11. The feeder assembly of claim 10, wherein said drop tube member is provided with feed passage means whereby feed from said feed conveyor can pass into said pan member, said passage means comprising an open bottom portion of said drop tube member.

12. The feeder assembly of claim 10, wherein said pan member is further provided with means for suspending said pan to facilitate cleaning thereof.

* * * * *

UNITED STATES PATENT AND TRADEMARK OFFICE
CERTIFICATE OF CORRECTION

PATENT NO. : 4,834,026
DATED : May 30, 1989
INVENTOR(S) : Howard S. Brembeck and Ray E. Swartzendruber It is certified that error appears in the above-identified patent and that said Letters Patent is hereby corrected as shown below:

Column 6, line 33 change from " claim 8" to --claim 7--

Column 6, line 40 change from "claim 8"--to claim 7--

Signed and Sealed this

Eighteenth Day of December, 1990

Attest:

HARRY F. MANBECK, JR.

*Attesting Officer*      *Commissioner of Patents and Trademarks*